United States Patent [19]

Bender et al.

[11] Patent Number: 5,363,244
[45] Date of Patent: Nov. 8, 1994

[54] HIGH BANDWIDTH OPTICAL MOUNT

[75] Inventors: Donald A. Bender, Dublin; Thomas Kuklo, Oakdale, both of Calif.

[73] Assignee: The United States of America as represented by the United States Department of Energy, Washington, D.C.

[21] Appl. No.: 967,492

[22] Filed: Oct. 28, 1992

[51] Int. Cl.⁵ .......................... G02B 7/02; G02B 27/00
[52] U.S. Cl. ..................... 359/823; 359/813; 359/896
[58] Field of Search .................. 359/196–198, 359/201, 223–226, 554–557, 808–830, 846–849, 871–875, 896, 225–227, 808, 811, 879, 823, 896, 872, 877; 248/487, 476

[56] References Cited

U.S. PATENT DOCUMENTS

| | | | |
|---|---|---|---|
| 4,331,384 | 5/1982 | Eisler | 359/896 |
| 4,973,145 | 11/1990 | Kirkwood et al. | 359/872 |
| 5,071,254 | 12/1991 | Vezain | 359/823 |
| 5,110,195 | 5/1992 | Loney | 359/224 |
| .177,644 | 1/1993 | Stark | 359/226 |

OTHER PUBLICATIONS

G. Shen, A. Gayhart, D. Eaton, E. F elber, W. Zukowski, Hughes Danbury Optical Syste , Inc., *Large angle fast steering mirrors*—(Article is a preprint; presented at Active and Adaptive Optical Components Conference—San Diego, Calif. Jul. 24–26, 1991 Published by Int Soc for Optical Engineering, Bellingham, Wash., USA pp. 286–293 1992.

Physik Instrumente (PI) GmbH & Co. Siemensstnrasse 13–15 W-7517 Waldbronn, Germany The Company (Brochure).

D. L. Kaplan, UTOS IR&D Fast Steering Mirror and AVLIS FSM Review, United Technologies Chart Presentation to Inventor.

*Primary Examiner*—Loha Ben
*Assistant Examiner*—Thong Nguyen
*Attorney, Agent, or Firm*—Miguel A. valdes; Roger S. Gaither; William R. Moser

[57] ABSTRACT

An optical mount, which directs a laser beam to a point by controlling the position of a light-transmitting optic, is stiffened so that a lowest resonant frequency of the mount is approximately one kilohertz. The optical mount, which is cylindrically-shaped, positions the optic by individually moving a plurality of carriages which are positioned longitudinally within a sidewall of the mount. The optical mount is stiffened by allowing each carriage, which is attached to the optic, to move only in a direction which is substantially parallel to a center axis of the optic. The carriage is limited to an axial movement by flexures or linear bearings which connect the carriage to the mount. The carriage is moved by a piezoelectric transducer. By limiting the carriage to axial movement, the optic can be kinematically clamped to a carriage.

15 Claims, 5 Drawing Sheets

HIGH BANDWIDTH OPTICAL MOUNT

The United States Government has rights in this invention pursuant to Contract No. W-7405-ENG-48 between the United States Department of Energy and the University of California.

BACKGROUND OF THE INVENTION

1. Field of the Invention

The present invention relates to the field of optical mounts and, in particular, to a device for stabilizing a process laser beam in the presence of parasitic vibrations.

2. Description of the Related Art

An optical mount is a device which points a laser beam by controlling the orientation of an optic. The laser beam strikes the optic and is directed to a further point on the optical pathway by the interaction between the beam and the optic. The optical mount can redirect the laser beam to another point by repositioning the optic. An optical system is series of optics and their mounts.

Frequently, externally generated forces, such as reaction forces created by repositioning the optic, rotating or oscillating machinery, pedestrian traffic, vehicular traffic, and acoustic noise, cause optics in the system to vibrate undesirably. When these optics vibrate, even small vibrations can cause the laser beam to move excessively.

Generally, most externally generated vibrations occur below 200 hertz. To correct for these vibrations, closed-loop control systems for the optical mount have been developed to sense the frequency of the beam motion due to external vibration and to reposition the optic to compensate for each movement induced by the vibration.

Externally generated vibrations which can induce a vibration in the optical system can also induce a vibration in the mount if the mount has a resonant frequency in the range of the externally generated vibrations. In addition, controlling the mount to compensate for beam motion due to external vibration requires a control system bandwidth significantly greater than that of the external vibrations. If the mount has resonant frequencies in the control bandwidth, the closed-loop control system must correct for the vibration of the mount as well as the beam motion of the optical system. It is desirable to have an optical mount which will not resonate below several times the 200 hertz external vibrations. The ability to compensate for the vibration of the mount as well as for beam motion in the optical system makes the closed-loop-control system more complicated and, therefore, more expensive.

A straight-forward closed-loop control system, which corrects for vibrations below 200 hertz, requires an optical mount with a minimum resonant frequency of approximately one kilohertz. The resonant frequency of an optical mount is defined by the square root of the stiffness of the mount which repositions the optic, divided by the mass of the optic.

The optical mounts which are commercially available and which have a minimum resonant frequency of approximately 1 kilohertz have several limitations. First, they are limited to light transmitting optics having a maximum diameter of approximately 5.1 centimeters. These small mounts are available from Burleigh and Physik Instrumente.

Mounts which sacrifice the ability to transmit light but still have resonant frequencies of 1 kilohertz are available from Physik Instrumente. These small (10 cm) mounts are further limited in that the optic is attached to the mount using adhesives or other rigid fasteners. This requires custom shapes for the optic making them more expensive and prohibiting their use in other mounts.

The large optical mounts which are commercially available suffer from in-band frequencies ranging from 20 to 50 hertz. These large optical mounts, which are manufactured by Ball Aerospace, United Technologies Optical Systems, and Hughes Danbury, are also limited in that the customized optic is permanently attached to the mount.

Thus, there is a need for an optical mount which can position a light transmitting optic, has a minimum resonant frequency of approximately one kilohertz and which can interchangeably accommodate optics with diameters in excess of 10 centimeters.

SUMMARY OF THE INVENTION

The present invention provides an optical mount for controlling the position of an optic. The optical mount comprises a plurality of carriage means connected to the optic for three-dimensionally positioning the optic, a plurality of support member means contacting each carriage means for limiting the carriage means to reciprocal movement within one dimension, the one dimension being substantially parallel to a central axis of the optic, and for preventing radial translation, tangential translation, and rotation of the carriage means, a plurality of actuator means for reciprocally moving the carriage in the one dimension, and housing means for supporting the support member means and the actuator means. The optic is three-dimensionally positioned by reciprocally moving each carriage means within the one dimension.

The present invention provides a way of increasing the stiffness of the optical mount so that large size optics can be used without complex control systems which are needed to account for an inband resonant frequency.

A better understanding of the features and advantages of the present invention will be obtained by reference to the following detailed description and accompanying drawings which set forth an illustrative embodiment in which the principles of the invention are utilized.

DETAILED DESCRIPTION OF THE INVENTION

A preferred embodiment of an optical mount 10 according to the present invention is described with reference to FIG. 1.

Figure 1:
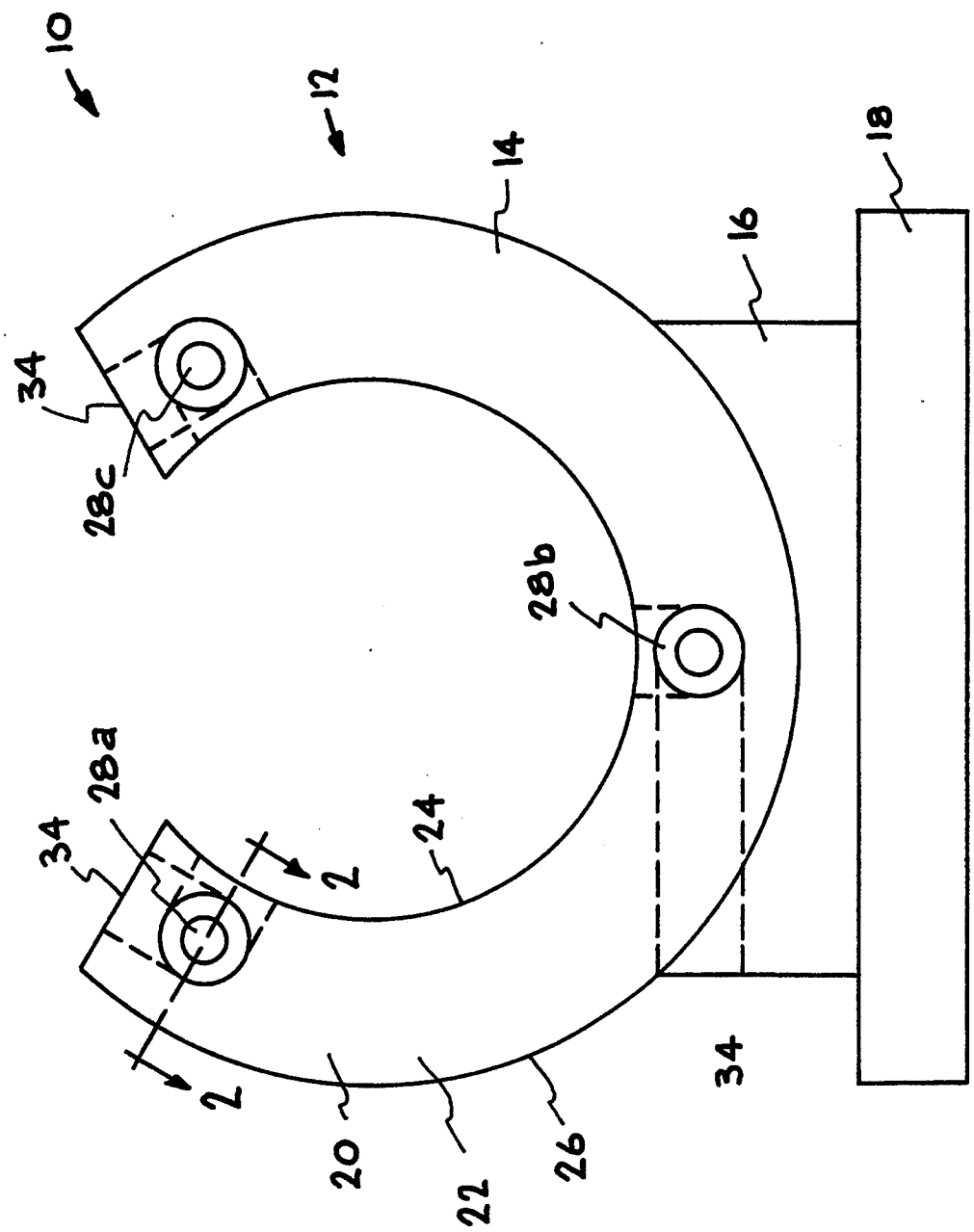
FIG. 1 is a front view of a high bandwidth optical mount in accordance with the present invention.

FIG. 1 shows the optical mount 10 of the present invention. The mount 10 includes a housing 12 for providing structural support and three positioning assemblies (not shown in FIG. 1) located within the mount for effecting movement of an optic.

The housing 12 has a C-shaped cylindrical portion 14 for structurally supporting the positioning assemblies, a cradle portion 16 for structurally supporting the C-shaped cylindrical portion 14, and a base portion 18 for structurally supporting the cradle portion 16. The housing 12 is machined from aluminum or steel and is sufficiently heavy to act as a passive countermass to the movement of the positioning assemblies.

Alternately, the C-shaped cylindrical portion 14 can be formed as a full cylindrically-shaped portion. A full cylindrically-shaped portion, however, increases the mass of the optical mount 10 without increasing the stiffness of the mount 10. The full cylindrically-shaped portion is not preferred because increasing the mass without increasing the stiffness of the housing decreases the resonant frequency of the mount 10.

The C-shaped cylindrical portion 14 has a front face 20, a back face (not shown in FIG. 1), a sidewall 22, an inner sidewall surface 24, an outer sidewall surface 26, and three equivalent openings 28a, 28b, and 28c. The openings 28a, 28b, and 28c are spaced at 120 degree intervals around the front face 20 of the C-shaped cylindrical portion 14.

Figure 2:
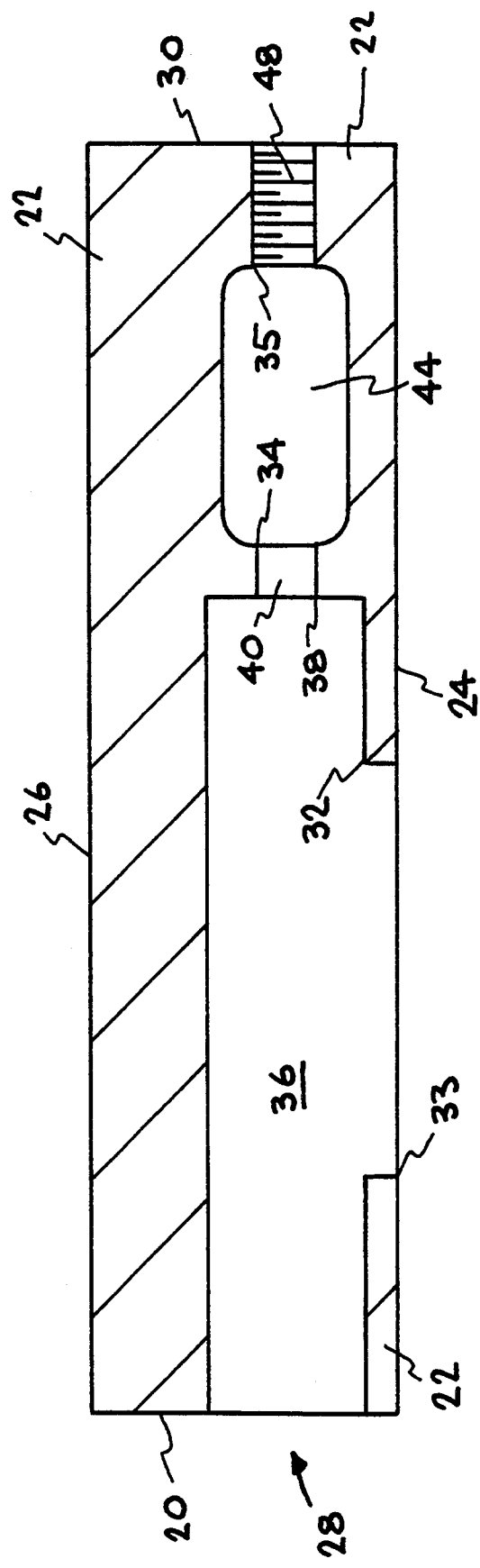
FIG. 2 is a plan sectional view of the high bandwidth optical mount taken along line 2—2 of FIG. 1.
Figure 3:
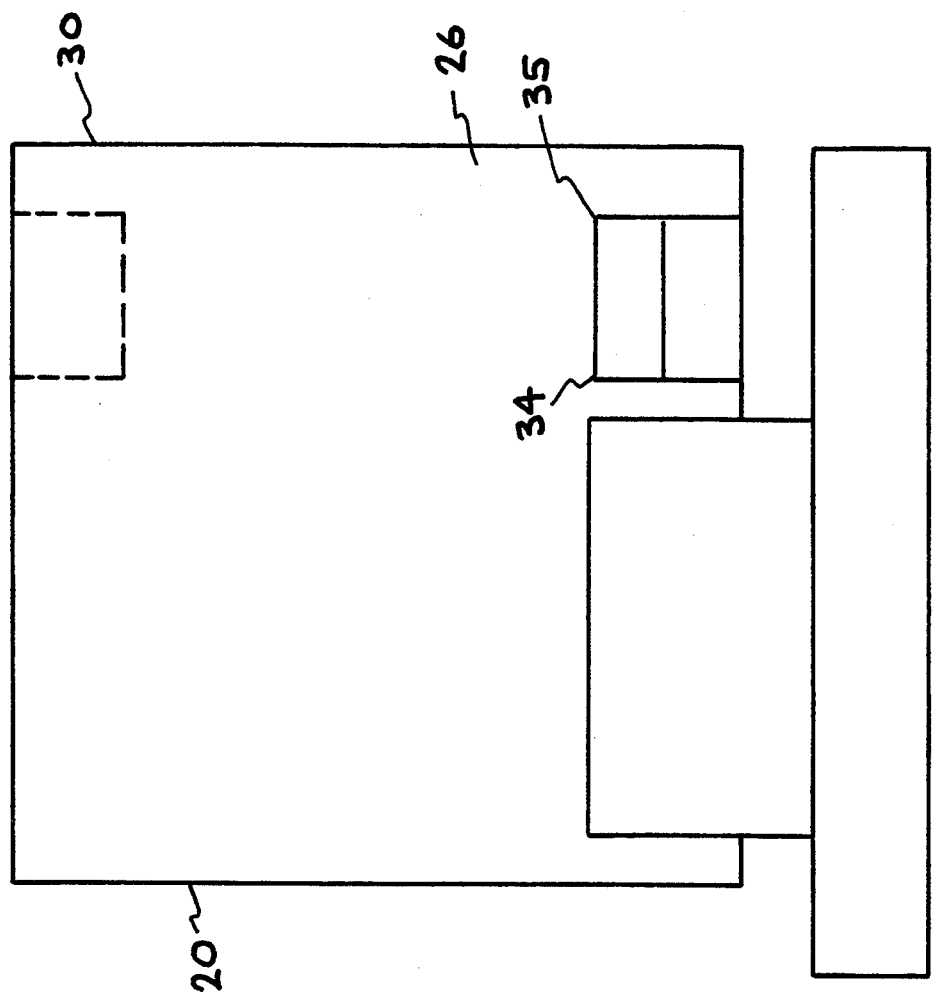
FIG. 3 is a side view of the high bandwidth optical mount in accordance with the present invention.

As shown in FIG. 2, each opening 28a, 28b, and 28c extends longitudinally through the sidewall 22 of the cylindrically-shaped portion 14 of the housing 12 from the front face 20 to the back face 30, extends through the sidewall 22 to the inner sidewall surface 24 between a first intermediate position 32 and a second intermediate position 33 located between the front face 20 and the back face 30, and extends through the sidewall 22 to the outer sidewall surface 26 between a third intermediate position 34 and a fourth intermediate position 35 (see FIG. 1 and FIG. 3).

As shown in FIG. 2, each opening 28a, 28b, and 28c forms a uniform-diameter carriage cavity 36. The carriage cavity 36, which extends from the front face 20 to a carriage point 38, opens into a reduced-diameter carriage arm cavity 40. The carriage arm cavity 40, which extends from the carriage point 38 to the third intermediate point 34, opens into an enlarged-diameter actuator cavity 44. The actuator cavity 44, which extends from the third intermediate point 34 to fourth intermediate point 35, opens into a reduced-diameter set-screw cavity 48 which extends from the fourth intermediate point 35 to the back face 30.

Figure 4:
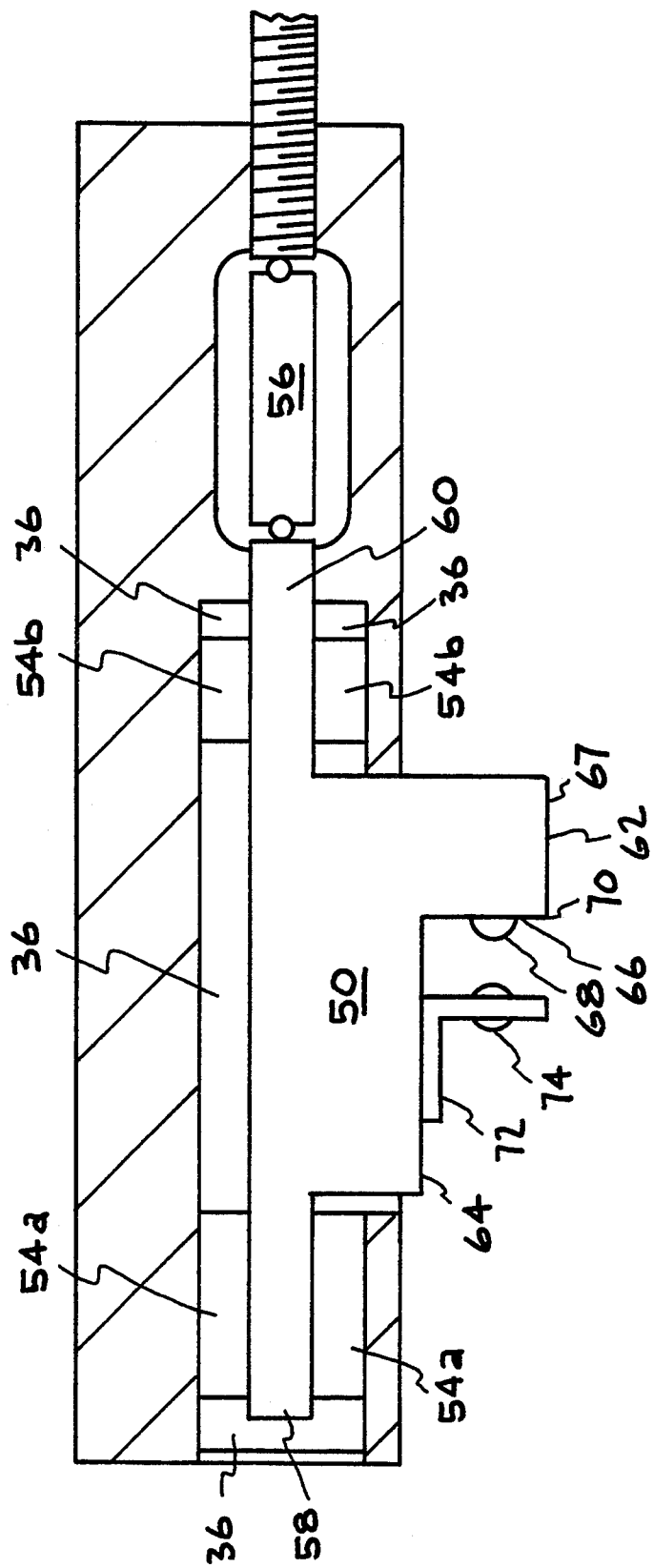
FIG. 4 is a plan-sectional view of the high bandwidth optical mount taken along line 2—2 of FIG. 1 showing a carriage, support members, positioning spacers, an actuator, and a set-screw.

As shown in FIG. 4, each pointing assembly, includes a carriage 50 for supporting the optic, support members 54a and 54b for guiding the movement of the carriage 50 within the opening 28a, 28b, and 28c, and an actuator 56 for providing movement of the carriage 50 within the opening 28a, 28b, and 28c.

The carriage 50, which is generally T-shaped, has a first arm 58, a second arm 60, and a bottom surface 62. The optic is supported by the carriage 50 by kinematically clamping the optic to the bottom surface 62 of the carriage 50. The bottom surface 62 of the carriage 50 includes a support side 64, an open left V-shaped side 66, and an end side 67, the open left V-shaped side extending between the support side 64 and the end side 67. A ball bearing 68 is then positioned within the V-shaped side 66. The ball bearing 68 is sized so that the ball bearing 68 extends beyond a top edge 70 of the V-shaped side 66.

As also shown in FIG. 4, a L-shaped member 72 is attached to the support side 64 of the carriage 50 so that a back side of the L-shaped member 72 contacts the support side 64 and a foot side, which has a circular opening therethrough, extends away from the support side 64 in a direction generally normal to the support side 64. A ball bearing 74 is then positioned within the circular opening in the foot side.

Figure 5:
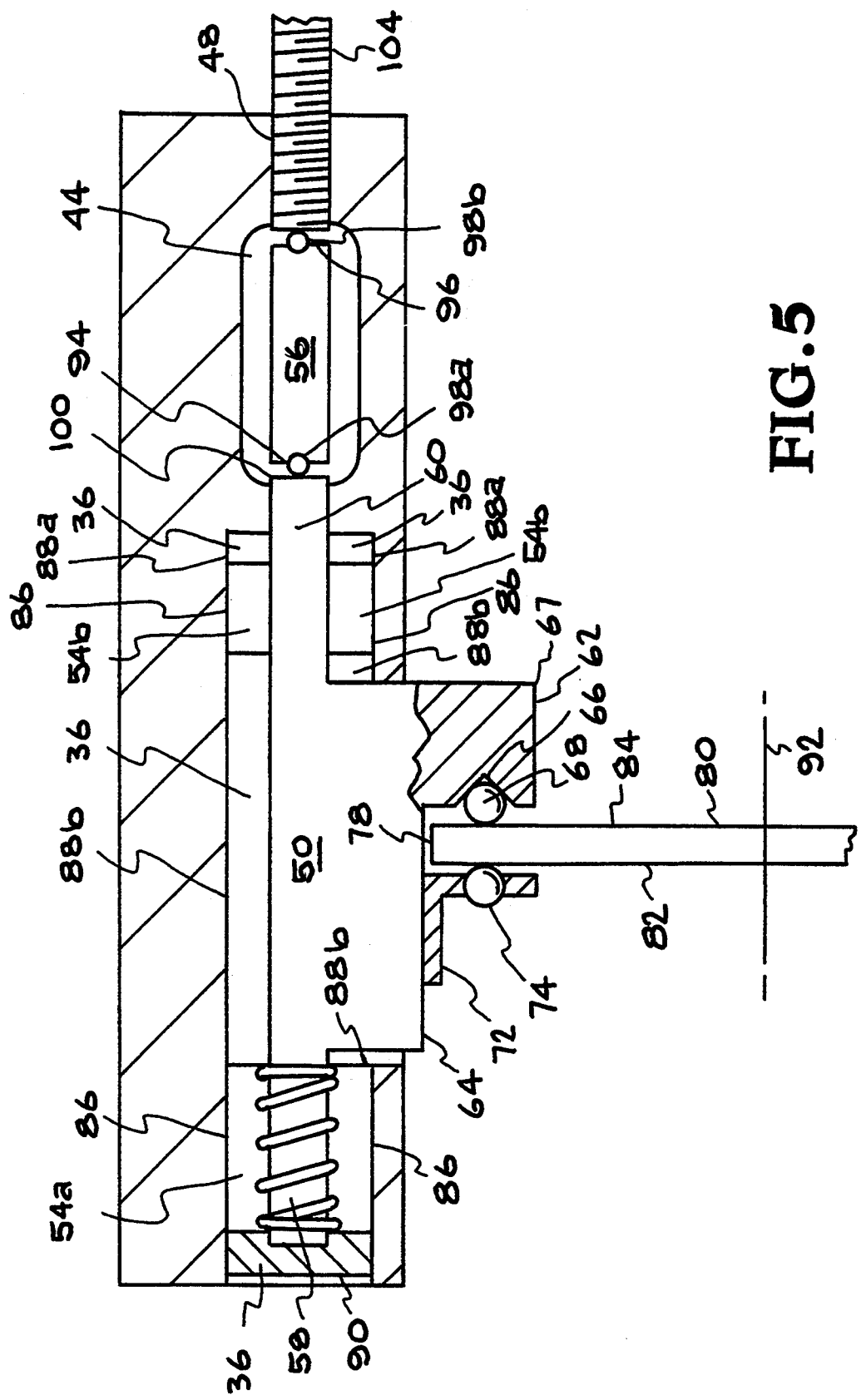
FIG. 5 is a plan-sectional view of the high bandwidth optical mount taken along line 2—2 of FIG. 1 showing a carriage, support members, positioning spacers, an actuator, a set-screw, and an optic.

Referring to FIG. 5, when positioned, an outer edge 78 of an optic 80 contacts the support side 64 of the carriage 50, a front edge 82 of the optic 80 contacts the ball bearing 68 positioned in the V-shaped side 66, and a back edge 84 of the optic 80 contacts the ball bearing 74 positioned in the opening in the foot of the L-shaped member 72. By clamping the optic 80 in the above-described manner, the optic 80 can rotate without introducing any bending stresses to the optic 80. Alternately, the optic 80 can be permanently attached to the bottom surface 62 of the carriage 50.

The carriage 50 is positioned within the housing 12 by the support members 54a and 54b. As shown in FIG. 5, a first support member 54a surrounds the first arm 58 while a second support member 54b surrounds the second arm 60. Each support member 54a and 54b is attached to an inner wall 86 of the carriage cavity 36 by positioning spacers 88a and 88b.

As shown in FIG. 5, a first positioning spacer 88a is attached to the inner wall 86 of the carriage cavity 36 between the second support member 54b and the carriage point 38. A second positioning spacer 88b is then attached to the inner wall 86 of the carriage cavity 36 between the first support member 54a and the second support member 54b. A spring (not shown in FIG. 3), is then positioned between the first support member 54a and an end cap 90 located at the front face 20. When assembled, the spring compresses the first and second positioning spacers 88a and 88b which compress the first and second support members 54a and 54b. When compressed, the first and second support members 54a and 54b expand radially against the inner wall 86 of the carriage cavity 36 to become rigidly positioned.

Alternatively, one support member can surround one arm of the carriage 50 if the total length of the one support member is substantially equivalent to the combined length of the first support member 54a and the second support member 54b.

The support members 54a and 54b allow the carriage 50 to travel in a direction which is substantially parallel to a central axis 92 of the optic 80 without radial translation, tangential translation, and rotation. In the preferred embodiment of the present invention, the support members 54a and 54b include flexures and linear bearings. Flexures are soft in the axial direction and stiff in the radial direction, while linear bearings have no stiffness in the axial direction but are stiff in the radial direction.

The stiffness of the mount 10 is a function of the length of the support members 54a and 54b and the spacing between the first and second support members 54a and 54b, the stiffness of the support members 54a and 54b, the stiffness of the carriage 50, and the stiffness of the housing 12. The amount of radial translation, tangential translation, and rotation of the carriage 50 defines the stiffness of the support members.

The actuator 56, which provides movement of the carriage 50 within each opening 28a, 28b, and 28c, has a carriage end 94 and a set-screw end 96. As shown in FIG. 5, the actuator 56 has a cup-shaped indentation at each end 94 and 96. Ball bearings 98a and 98b are positioned within each cup-shaped indentation in the carriage end 94 and the set-screw end 96, respectively, thereby forming a third curved surface at the carriage end 94 and a fourth curved surface at the set-screw end 96.

When assembled, the third curved surface contacts an end 100 of the second arm 60 of the carriage 50 and the fourth curved surface contacts a set-screw 104. The set-screw 104, which is threaded into the set-screw cavity 48, extends into the actuator cavity 44. The spring (not shown in FIG. 5), which compresses the first and second positioning spacers 88a and 88b, also compresses the carriage 50 against the actuator 56 and the set screw 104. By assembling the actuator 56 in the above described manner, the actuator 56 is free to expand and contract without bending.

The actuator 56, which is a piezoelectric transducer, can be any commercially available device, like Model P-830 manufactured by Physik Instrumente which has a range of motion within the range of 150 microradians and a pointing resolution of 0.1 microradians.

By allowing only axial movement of the carriage 50, the present invention provides several advantages. First, by limiting the radial translation, tangential translation, and rotation of the carriage 50, the present invention provides the stiffness required to produce an optical mount 10 with an approximately 1 kilohertz resonant frequency.

Second, in addition to substantially enhancing the stiffness of the carriage 50, by allowing only axial movement of the carriage 50, a bezel, which is a rim for holding the optic 80, can be eliminated. This significantly reduces the moving mass of the optic 80 and eliminates hardware from behind the mount 10 which can interfere with the beam path.

Third, by allowing only axial movement, the optic 80 can be kinematicly clamped to the carriage 50. Since the kinematic clamping does not require the optic 80 to be fixably attached to the carriage 50, multiple optics can be used with one mount 10.

It should be understood that various alternatives to the structures described herein may be employed in practicing the present invention. It is intended that the following claims define the invention and that structures within the scope of these claims and their equivalents be covered thereby.

What is claimed is:

1. An optical mount for controlling the position of an optic having a central axis, an outer radial edge, a front edge, and a back edge, the optical mount comprising:

a plurality of carriage means for three-dimensionally positioning the optic, each carriage means connected to the optic;

a plurality of first support member means, each first support member means limiting one of the plurality of carriage means to reciprocal movement within one dimension and for preventing radial translation, tangential translation, and rotation of said one of the plurality of carriage means, the one dimension of reciprocating movement being substantially parallel to the central axis of the optic;

a plurality of actuator means for reciprocatingly moving the carriage means in the one direction, each actuator means connected to one of the plurality of carriage means;

housing means for supporting the plurality of first support member means and the plurality of actuator means, wherein the optic is three-dimensionally positioned by reciprocally moving each carriage means within the one dimension.

2. The optical mount of claim 1 wherein each of the carriage means comprises a first arm, a second arm, and a bottom side.

3. The optical mount of claim 2 wherein the bottom side further comprises a support side, an open left V-shaped side, and an end side, the open left V-shaped side disposed between the support side and the end side.

4. The optical mount of claim 3 further comprising:

a first ball bearing positioned within the V-shaped side and extending beyond an opening of the open left V-shaped side;

an L-shaped member having a back side and a foot side, the back side being attached to the support side, the foot side extending away from the support side, the L-shaped member having an opening in the foot side;

a second ball bearing positioned within the opening of the L-shaped member foot side, wherein the optic outer edge contacts the carriage means support side, the optic back edge contacts the first ball bearing, and the optic front edge contacts the second ball bearing, causing the optic to be kinematically clamped to the carriage means bottom side.

5. The optical mount of claim 1 and further comprising a plurality of second support member means, each second support member means further limiting one of the plurality of carriage means to reciprocal movement within one dimension and for preventing radial translation, tangential translation, and rotation of said one of the plurality of carriage means, the one dimension of reciprocating movement being substantially parallel to the central axis of the optic.

6. The optical mount of claim 5 wherein the plurality of first support member means and the plurality of second support member means comprises a linear bearing or a flexure.

7. The optical mount of claim 5 wherein the plurality of first support member means can frictionally or flexurally contact each carriage means.

8. The optical mount of claim 2 and further comprising a plurality of second support member means, each second support member means further limiting one of the plurality of carriage means to reciprocal movement within one dimension and for preventing radial translation, tangential translation, and rotation of said one of the plurality of carriage means, the one dimension of reciprocating movement being substantially parallel to the central axis of the optic, each first support member means being connected to the first arm of one of the plurality of carriage means and each second support member means being connected to the second arm of one of the plurality of carriage means.

9. The optical mount of claim 8 wherein the plurality of first support member means and the plurality of second support member means comprises a linear bearing or a flexure.

10. The optical mount of claim 8 wherein the plurality of first support member means and the plurality of second support member means can frictionally or flexurally contact each carriage means.

11. The optical mount of claim 1 wherein the actuator means comprises an actuator having a carriage end and a housing end.

12. The optical mount of claim 11 further comprising a carriage ball bearing and a housing ball bearing, the carriage ball bearing positioned between the carriage end of the actuator and one of the plurality of carriage means, the housing ball bearing positioned between the housing end of the actuator and the housing means,
wherein the carriage ball bearing and the housing ball bearing allow the actuator to expand and contract without bending.

13. The optical mount of claim 1 wherein the housing means comprises a C-shaped cylindrical portion for supporting the plurality of first support member means and the actuator means, a cradle portion for supporting the C-shaped cylindrical portion, and a base portion for supporting the cradle portion, the C-shaped cylindrical portion having a front face, a back face, a sidewall, an inner sidewall surface, and an outer sidewall surface.

14. The optical mount of claim 13 wherein the C-shaped cylindrical portion has a plurality of openings extending longitudinally through the sidewall from the front face to the back face, extending through the sidewall to the inner sidewall surface between a first intermediate position and a second intermediate position located between the front face and the back face, and extending through the sidewall to the outer sidewall surface between a third intermediate position and a fourth intermediate position located between the front face and the back face, the opening having an inner opening surface.

15. The optical mount of claim 14 further comprising a plurality of first positioning spacers, a plurality of second positioning spacers, a plurality of second support member means, a plurality of end caps, and a plurality of springs, each first positioning spacer disposed between the inner opening surface at the first intermediate position of each C-shaped cylindrical portion and one of the first support member means, each second positioning spacer positioned between one of the first support member means and one of the second support member means, each spring positioned between one of the second support member means and one of the end caps,
wherein each spring compresses the second support member means, the second positioning spacer, the first support member means, and the first positioning spacer causing the first support member means and the second support member means to expand radially and become rigidly attached to the inner opening surface.

* * * * *